United States Patent
Wang

(10) Patent No.: US 12,179,215 B1
(45) Date of Patent: Dec. 31, 2024

(54) METHOD OF SEPARATING NICKEL AND COBALT FROM NICKEL AND COBALT MIXED POWDER

(71) Applicant: PUKYONG NATIONAL UNIVERSITY INDUSTRY-UNIVERSITY COOPERATION FOUNDATION, Busan (KR)

(72) Inventor: Jei Pil Wang, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 17 days.

(21) Appl. No.: 18/348,586

(22) Filed: Jul. 7, 2023

(30) Foreign Application Priority Data

Jun. 9, 2023 (KR) .................. 10-2023-0074049

(51) Int. Cl.
B03C 1/015 (2006.01)
B03C 1/02 (2006.01)

(52) U.S. Cl.
CPC .............. B03C 1/015 (2013.01); B03C 1/02 (2013.01); *B03C 2201/20* (2013.01)

(58) Field of Classification Search
CPC ........ B03C 1/015; B03C 1/00; B03C 2201/20
See application file for complete search history.

(56) References Cited

U.S. PATENT DOCUMENTS

| 4,388,179 A * | 6/1983 | Lewis ............ C10G 1/00 210/695 |
| 4,717,469 A * | 1/1988 | Pirc ............. B03C 1/02 209/229 |
| 7,571,814 B2 * | 8/2009 | Birken ........... C22B 23/005 423/151 |
| 2005/0092657 A1 * | 5/2005 | Birken ........... C22B 1/00 423/139 |
| 2021/0269894 A1 * | 9/2021 | Wang ............. C01G 53/04 |

* cited by examiner

*Primary Examiner* — Michael McCullough
*Assistant Examiner* — Kalyanavenkateshware Kumar
(74) *Attorney, Agent, or Firm* — NORTON ROSE FULBRIGHT US LLP

(57) ABSTRACT

Disclosed is a method for separating nickel powders and cobalt powders from each other in a mixture of nickel powders and cobalt powders. The method includes a first step of heating a mixture of nickel powders and cobalt powders received in a container to a temperature of 350° C. to 500° C.; and a second step of reacting the heated mixture with a magnet to separate the nickel powders and the cobalt powders from each other, wherein in the second step, not the nickel powders but the cobalt powders react with the magnet, and thus the cobalt powders move out of the container and thus are separated from the nickel powders.

20 Claims, 1 Drawing Sheet

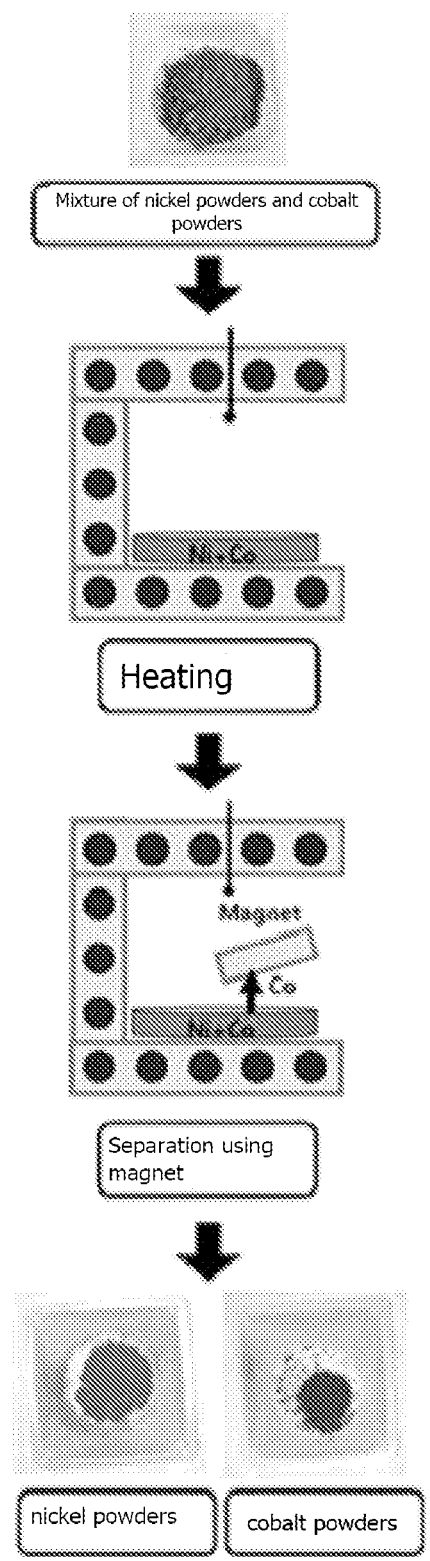

METHOD OF SEPARATING NICKEL AND COBALT FROM NICKEL AND COBALT MIXED POWDER

CROSS-REFERENCE TO RELATED APPLICATION

This application claims priority from Korean Patent Application No. 10-2023-0074049 filed on Jun. 9, 2023 in the Korean Intellectual Property Office, and all the benefits accruing therefrom under 35 U.S.C. 119, the contents of which in its entirety are herein incorporated by reference.

BACKGROUND

Field

The present disclosure relates to a method for separating nickel powders and cobalt powders from each other in a mixture of nickel powders and cobalt powders using Curie temperature.

Description of Related Art

Since nickel and cobalt have similar chemical properties, it is one of the most difficult tasks to separate nickel and cobalt from each other in an aqueous solution or in a powder phase. In the prior art, a solvent extraction method is widely used to separate nickel and cobalt from each other in an aqueous solution containing the same. The solvent extraction method includes mixing a cationic or anionic extractant with an aqueous solution and stirring the mixture. However, since cobalt and nickel have very similar physical properties, there is a problem in that the separation efficiency of the solvent extraction method is low, and a condition such as pH should be precisely controlled. Alternatively, a method using high-pressure air is used to separate nickel and cobalt from each other. However, this method requires a process of controlling particle sizes of powders based on a process condition, thereby increasing the number of steps of the method.

SUMMARY

Accordingly, a purpose of the present disclosure is to provide a method for easily separating nickel powders and cobalt powders from each other in a mixture of nickel powders and cobalt powders in a simple process.

Purposes of the present disclosure are not limited to the above-mentioned purpose. Other purposes and advantages of the present disclosure that are not mentioned may be understood based on following descriptions, and may be more clearly understood based on embodiments of the present disclosure. Further, it will be easily understood that the purposes and advantages of the present disclosure may be realized using means shown in the claims and combinations thereof.

The Curie temperature means the temperature at which a ferromagnetic substance transitions to a paramagnetic substance. Each of nickel and cobalt is a ferromagnetic substance exhibiting ferromagnetism. The Curie temperature of nickel is about 358° C., and the Curie temperature of cobalt is about 1130° C. The present disclosure provides a method for separating nickel powders and cobalt powders from each other in a mixture thereof using the Curie temperature of each of nickel and cobalt.

In order to achieve the above purpose, the present disclosure may provide a method for separating nickel powders and cobalt powders from each other in a mixture of nickel powders and cobalt powders, the method comprising: a first step of heating a mixture of nickel powders and cobalt powders received in a container to a temperature of 350° C. to 500° C.; and a second step of reacting the heated mixture with a magnet to separate the nickel powders and the cobalt powders from each other, wherein in the second step, not the nickel powders but the cobalt powders react with the magnet, and thus the cobalt powders move out of the container and thus are separated from the nickel powders.

In one implementation, the first step and the second step are performed in a gas atmosphere selected from nitrogen gas or argon gas.

In one implementation, the gas is injected into the container at a rate of 100 to 500 cc/min.

In one implementation, the container is made of one selected from a group consisting of alumina, carbon and mullite.

In one implementation, the magnet is one selected from a samarium cobalt (Sm-Co) magnet or an Alnico magnet.

According to the present disclosure, the method may easily separate the nickel powders and the cobalt powders from each other in the mixture thereof only via the heating process based on the Curie temperature of each of the nickel powders and the cobalt powders.

Effects of the present disclosure are not limited to the above-mentioned effects, and other effects as not mentioned will be clearly understood by those skilled in the art from following descriptions.

BRIEF DESCRIPTION OF DRAWINGS

FIG. 1 is a diagram for illustrating a method of separating nickel powders and cobalt powders from each other in a mixture of nickel powders and cobalt powders according to the present disclosure.

DETAILED DESCRIPTION

Advantages and features of the present disclosure, and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for describing embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

FIG. 1 is a view for illustrating a method for separating nickel powders and cobalt powders from each other in a mixture of nickel powders and cobalt powders according to the present disclosure.

Referring to FIG. 1, the separation method of the present disclosure includes a first step of heating a mixture of nickel powders and cobalt powders contained in a container, and a second step of reacting the heated mixture with a magnet to separate the nickel powers and the cobalt powders from each other.

The container may be made of a material that is not affected by magnetism, and may be made of, for example, any one selected from the group consisting of alumina, carbon, and mullite. Preferably, the container may be embodied as an alumina crucible.

A shape and a size of a particle of each of the nickel powder and the cobalt powder are not particularly limited in the present disclosure. However, for example, each of the nickel powder and the cobalt powder may have a particle size in a range of 1 nm to 100 mm, and the shape thereof may be a spherical particle.

The heating may be performed under a Curie temperature condition at which nickel becomes paramagnetic. When the heating temperature is too high, both the cobalt and nickel may become paramagnetic. Thus, the heating may be performed under a temperature condition higher than or equal to the Curie temperature of nickel and lower than the Curie temperature of cobalt. Preferably, the heating may be performed at a temperature of about 350° C. to 500° C.

During the first step, nickel loses its magnetism and becomes a paramagnetic substance in the mixture, and the cobalt is not affected and may maintain its original properties.

The magnet may be made of a material that does not lose magnetism even in a temperature range in which the nickel becomes paramagnetic and loses magnetism, that is, in a temperature range at which the mixture is heated. Accordingly, in one embodiment, the magnet may be any one selected from a samarium cobalt (Sm-Co) magnet or an Alnico magnet.

During the second step, the cobalt powder reacts with the magnet due to its magnetic property and move out of the container and thus is separated from the nickel powder in the mixture. Further, since the nickel loses its magnetic property via the heating, the nickel powder does not react with the magnet and is received inside the container during the second step.

Additionally, each of the first step and the second step may be performed under an inert gas atmosphere such as nitrogen, argon, or helium to prevent oxidation of the powder. In one embodiment, the first and second steps may be performed in a gas atmosphere selected from nitrogen gas or argon gas. In this regard, the gas may be injected at a rate of about 100 to 500 cc/min.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

What is claimed is:

1. A method for separating nickel powders and cobalt powders from each other in a mixture of nickel powders and cobalt powders, the method comprising:
    a first step of heating a mixture of nickel powder comprising nickel and cobalt powder comprising cobalt in a container to a temperature of 350° C. to 500° C. such that the nickel powders loses its magnetic property via the heating; and
    a second step of reacting the heated mixture with a magnet to separate the nickel powder and the cobalt powder from each other,
    wherein in the second step the nickel powder does not react with the magnet and the cobalt powder reacts with the magnet thereby separating the cobalt powder from the nickel powder.

2. The method of claim 1, wherein the first step and the second step are performed in a gas atmosphere selected from helium gas, nitrogen gas or argon gas.

3. The method of claim 1, wherein a gas is injected into the container at a rate of 100 to 500 cc/min.

4. The method of claim 1, wherein the container is made of one selected from a group consisting of alumina, carbon and mullite.

5. The method of claim 1, wherein the magnet is one selected from a samarium cobalt (Sm-Co) magnet or an Alnico magnet.

6. The method of claim 1, wherein the container comprises alumina.

7. The method of claim 1, wherein the container comprises carbon.

8. The method of claim 1, wherein the container comprises mullite.

9. The method of claim 1, wherein the magnet comprises a samarium cobalt (Sm-Co) magnet.

10. The method of claim 9, wherein the first step and the second step are performed in a gas atmosphere comprising helium gas, nitrogen gas or argon gas.

11. The method of claim 9, wherein the first step and the second step are performed in a gas atmosphere comprising nitrogen gas.

12. The method of claim 9, wherein the first step and the second step are performed in a gas atmosphere comprising argon gas.

13. The method of claim 1, wherein the magnet comprises an Alnico magnet.

14. The method of claim 13, wherein the first step and the second step are performed in a gas atmosphere comprising helium gas, nitrogen gas or argon gas.

15. The method of claim 13, wherein the first step and the second step are performed in a gas atmosphere comprising nitrogen gas.

16. The method of claim 13, wherein the first step and the second step are performed in a gas atmosphere comprising argon gas.

17. The method of claim 1, wherein the first step and the second step are performed in a gas atmosphere comprising nitrogen gas.

18. The method of claim 1, wherein the first step and the second step are performed in a gas atmosphere comprising argon gas.

19. The method of claim 1, wherein the nickel powder comprises at least two nickel powders.

20. The method of claim 1, wherein the cobalt powder comprises at least two cobalt powders.

* * * * *